United States Patent
Scott et al.

(10) Patent No.: US 11,296,867 B2
(45) Date of Patent: Apr. 5, 2022

(54) SYSTEMS AND METHODS FOR HASH CHAIN MIGRATION

(71) Applicant: Intuit Inc., Mountain View, CA (US)

(72) Inventors: Glenn Scott, Los Altos Hills, CA (US); Michael Richard Gabriel, Portola Valley, CA (US)

(73) Assignee: Intuit Inc., Mountain View, CA (US)

( * ) Notice: Subject to any disclaimer, the term of this patent is extended or adjusted under 35 U.S.C. 154(b) by 442 days.

(21) Appl. No.: 16/400,783

(22) Filed: May 1, 2019

(65) Prior Publication Data
US 2020/0351076 A1 Nov. 5, 2020

(51) Int. Cl.
*H04L 9/06* (2006.01)

(52) U.S. Cl.
CPC ........ *H04L 9/0643* (2013.01); *H04L 2209/38* (2013.01)

(58) Field of Classification Search
CPC . H04L 9/0643; H04L 2209/38; H04L 9/3239; G06F 21/64
USPC ........................................................ 380/28
See application file for complete search history.

(56) References Cited

U.S. PATENT DOCUMENTS

| | | | | |
|---|---|---|---|---|
| 10,733,341 B1* | 8/2020 | Cascioli | ................... | G06F 30/30 |
| 2010/0185847 A1* | 7/2010 | Shasha | .................... | G06F 21/54 |
| | | | | 713/150 |
| 2018/0139186 A1* | 5/2018 | Castagna | ............... | H04L 9/3242 |
| 2019/0013934 A1* | 1/2019 | Mercuri | ............... | G06F 11/3476 |
| 2019/0155795 A1* | 5/2019 | Xiao | ......................... | G06F 9/52 |
| 2019/0370366 A1* | 12/2019 | Scott | ..................... | H04L 9/0637 |
| 2020/0084217 A1* | 3/2020 | Judka | ..................... | H04L 63/101 |
| 2020/0174679 A1* | 6/2020 | Scott | ..................... | G06F 3/0659 |
| 2020/0174988 A1* | 6/2020 | Scott | ..................... | G06F 40/205 |
| 2021/0081401 A1* | 3/2021 | Khatami | ............. | G06F 16/2379 |

OTHER PUBLICATIONS

Asutosh Palai, MeetVora, Aashaka Shah. Empowering Light Nodes in Blockchains with Block Summarization. 2018. Pages 1-5. (Year: 2018).*

* cited by examiner

*Primary Examiner* — Kambiz Zand
*Assistant Examiner* — Aubrey H Wyszynski
(74) *Attorney, Agent, or Firm* — Ferguson Braswell Fraser Kubasta PC

(57) ABSTRACT

A method for hash chain migration includes detecting a version update of an object that includes a hash chain that stores fields of the object. Sub chains are identified from the hash chain. Migration sub chains are generated from the plurality of sub chains using a plurality of processes. Container blocks are generated from the plurality of migration sub chains. A migration chain is generated from the plurality of container blocks. The object is accessed using the migration chain.

20 Claims, 12 Drawing Sheets

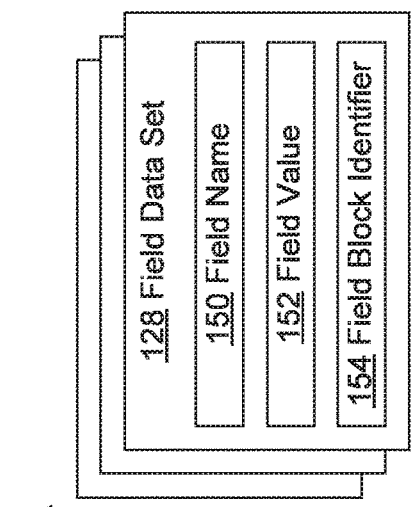
*Figure 1D*
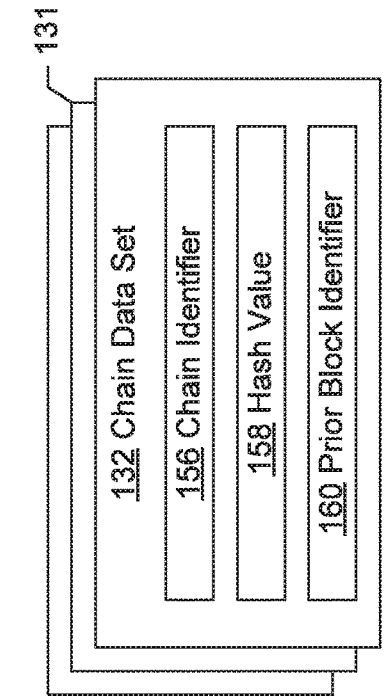
*Figure 1E*
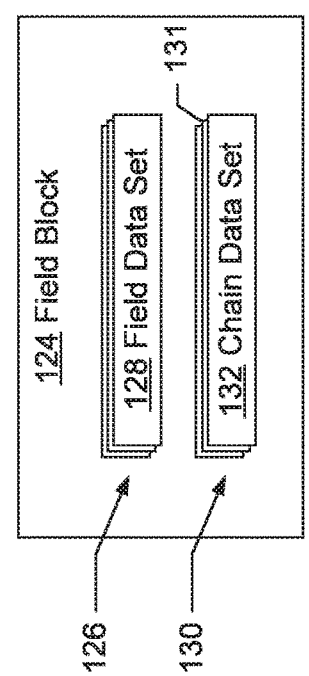
*Figure 1B*
*Figure 1C*

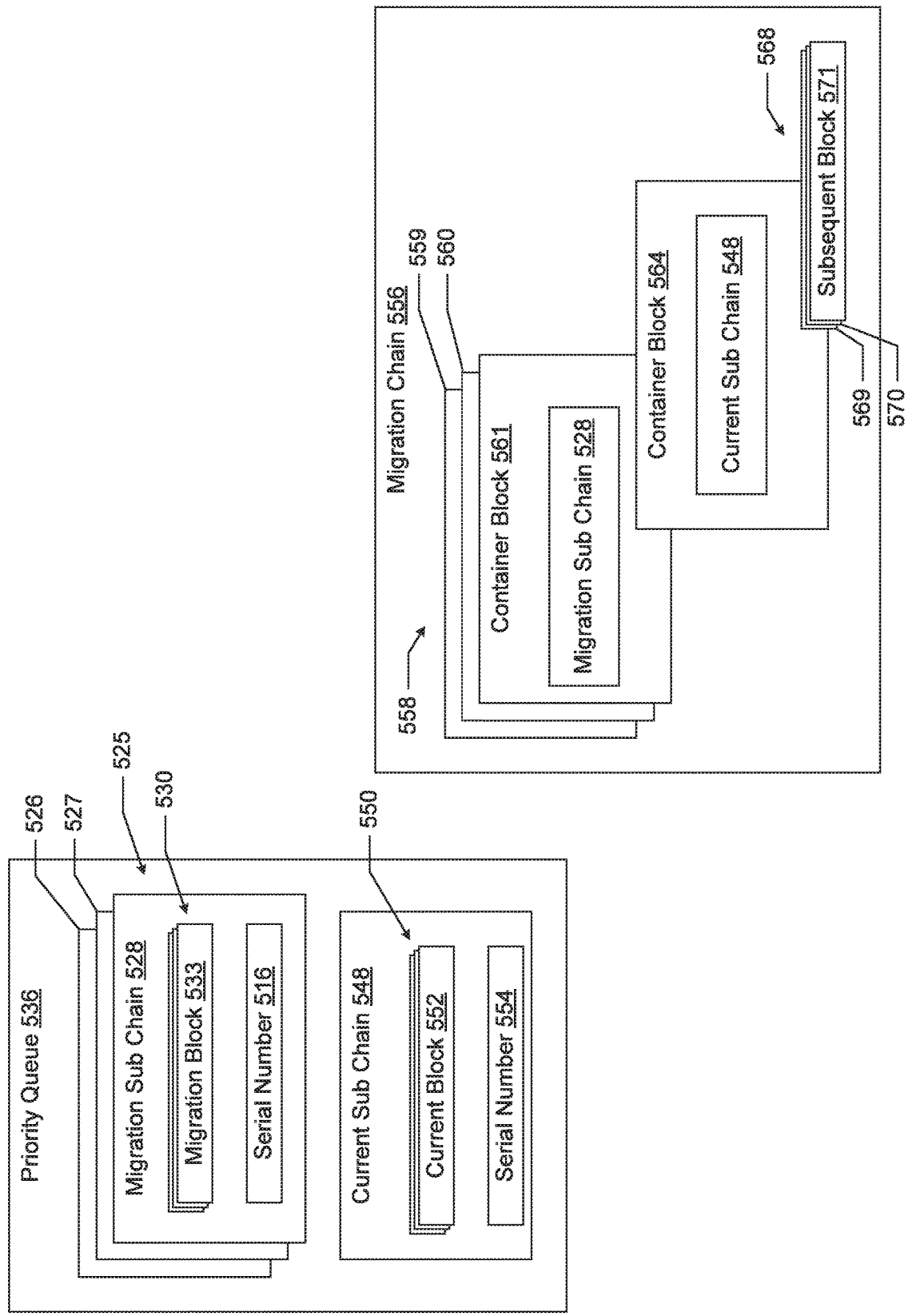

| | | | | | |
|---|---|---|---|---|---|
| 602 → | Block 0 614 | Block 0 616 | Null 618 | Hash 0 620 | Block 0 Data 622 | Version 1 624 |
| 604 → | Block 1 626 | Block 0 628 | Hash 0 630 | Hash 1 632 | Block 1 Data 634 | Version 1 636 |
| 606 → | Block 2 638 | Block 1 640 | Hash 1 642 | Hash 2 644 | Block 2 Data 646 | Version 1 648 |
| 608 → | Block 3 650 | Block 2 652 | Hash 2 654 | Hash 3 656 | Block 3 Data 658 | Version 1 660 |
| 610 → | Block 4 662 | Block 3 664 | Hash 3 666 | Hash 4 668 | Block 4 Data 670 | Version 1 672 |
| 612 → | Block 5 674 | Block 4 676 | Hash 4 678 | Hash 5 680 | Block 5 Data 682 | Version 1 684 |

| 702 → | Migration Block 0 708 | Migration Block 0 710 | Null 712 | Hash 6 714 | Migration Block 0 Data 716 | Version 2 718 |
| 704 → | Migration Block 1 720 | Migration Block 0 722 | Hash 6 724 | Hash 9 726 | Migration Block 1 Data 728 | Version 2 730 |
| 706 → | Migration Block 2 732 | Migration Block 1 734 | Hash 9 736 | Hash 12 738 | Migration Block 2 Data 740 | Version 2 742 |

| 802 → | Migration Block 3 808 | Migration Block 3 810 | Null 812 | Hash 7 814 | Migration Block 3 Data 816 | Version 2 818 |
| 804 → | Migration Block 4 820 | Migration Block 3 822 | Hash 7 824 | Hash 10 826 | Migration Block 4 Data 828 | Version 2 830 |
| 806 → | Migration Block 5 832 | Migration Block 4 834 | Hash 10 836 | Hash 14 838 | Migration Block 5 Data 840 | Version 2 842 |

| 902 → | Current Block 6 908 | Current Block 6 910 | Null 912 | Hash 8 914 | Current Block 6 Data 916 | Version 2 918 |
| 904 → | Current Block 7 920 | Current Block 6 922 | Hash 8 924 | Hash 11 926 | Current Block 7 Data 928 | Version 2 930 |
| 906 → | Current Block 8 932 | Current Block 7 934 | Hash 11 936 | Hash 16 938 | Current Block 8 Data 940 | Version 2 942 |

| | Container Block 0 1012 | Container Block 0 1014 | Null 1016 | Hash 13 1018 | Migration Sub Chain of Blocks 0, 1, 2 1020 | Version 2 1022 |
|---|---|---|---|---|---|---|
| 1002 → | | | | | | |
| 1004 → | Container Block 1 1024 | Container Block 0 1026 | Hash 13 1028 | Hash 15 1030 | Migration Sub Chain of Blocks 3, 4, 5 1032 | Version 2 1034 |
| 1006 → | Container Block 2 1036 | Container Block 1 1038 | Hash 15 1040 | Hash 17 1042 | Sub Chain of Current Blocks 6, 7, 8 1044 | Version 2 1046 |
| 1008 → | Subsequent Block 9 1048 | Container Block 2 1050 | Hash 17 1052 | Hash 18 1054 | Subsequent Block 9 Data 1056 | Version 2 1058 |
| 1010 → | Subsequent Block 10 1060 | Subsequent Block 9 1062 | Hash 18 1064 | Hash 19 1066 | Subsequent Block 10 Data 1068 | Version 2 1070 |

SYSTEMS AND METHODS FOR HASH CHAIN MIGRATION

BACKGROUND

Computer programming objects store information with sets of fields. The state of an object is determined by the values for the fields of the object. Hash chains may be used within objects to store historical field values and states of the object. Objects may be updated and rewritten using different versions that have different field names, values, data types, functions, methods, and logic to store and process information. Objects of one version may not be compatible with objects of another version. Better methods are needed for migrating objects with hash chains between different versions.

SUMMARY

In general, in one aspect, one or more embodiments relate to a method for hash chain migration. A version update of an object is detected that includes a hash chain that stores fields of the object. Sub chains are identified from the hash chain. Migration sub chains are generated from the plurality of sub chains using a plurality of processes. Container blocks are generated from the plurality of migration sub chains. A migration chain is generated from the plurality of container blocks. The object is accessed using the migration chain.

In general, in one aspect, one or more embodiments relate to a system for hash chain migration. The system includes a memory coupled to a computer processor. The memory includes an object that includes a hash chain. A version update of the object is detected that includes a hash chain that stores fields of the object. Sub chains are identified from the hash chain. Migration sub chains are generated from the plurality of sub chains using a plurality of processes. Container blocks are generated from the plurality of migration sub chains. A migration chain is generated from the plurality of container blocks. The object is accessed using the migration chain.

In general, in one aspect, one or more embodiments relate to a system for hash chain migration. The system includes a memory coupled to a computer processor. The memory includes an object that includes a hash chain. A version update of the object is detected that includes a hash chain that stores fields of the object. The object is locked after detecting the version update of the object. Sub chains are identified from the hash chain. Migration sub chains are generated from the plurality of sub chains using a plurality of processes. Container blocks are generated from the plurality of migration sub chains. A migration chain is generated from the plurality of container blocks. The object is unlocked. The object is accessed using the migration chain.

Other aspects of the invention will be apparent from the following description and the appended claims.

BRIEF DESCRIPTION OF DRAWINGS

FIG. 1A, FIG. 1B, FIG. 1C, FIG. 1D, FIG. 1E, and FIG. 1F show a system in accordance with one or more embodiments of the present disclosure.

FIG. 5A, FIG. 5B, FIG. 6, FIG. 7, FIG. 8, FIG. 9, and FIG. 10 show examples in accordance with one or more embodiments of the present disclosure.

DETAILED DESCRIPTION

Figure 1A:
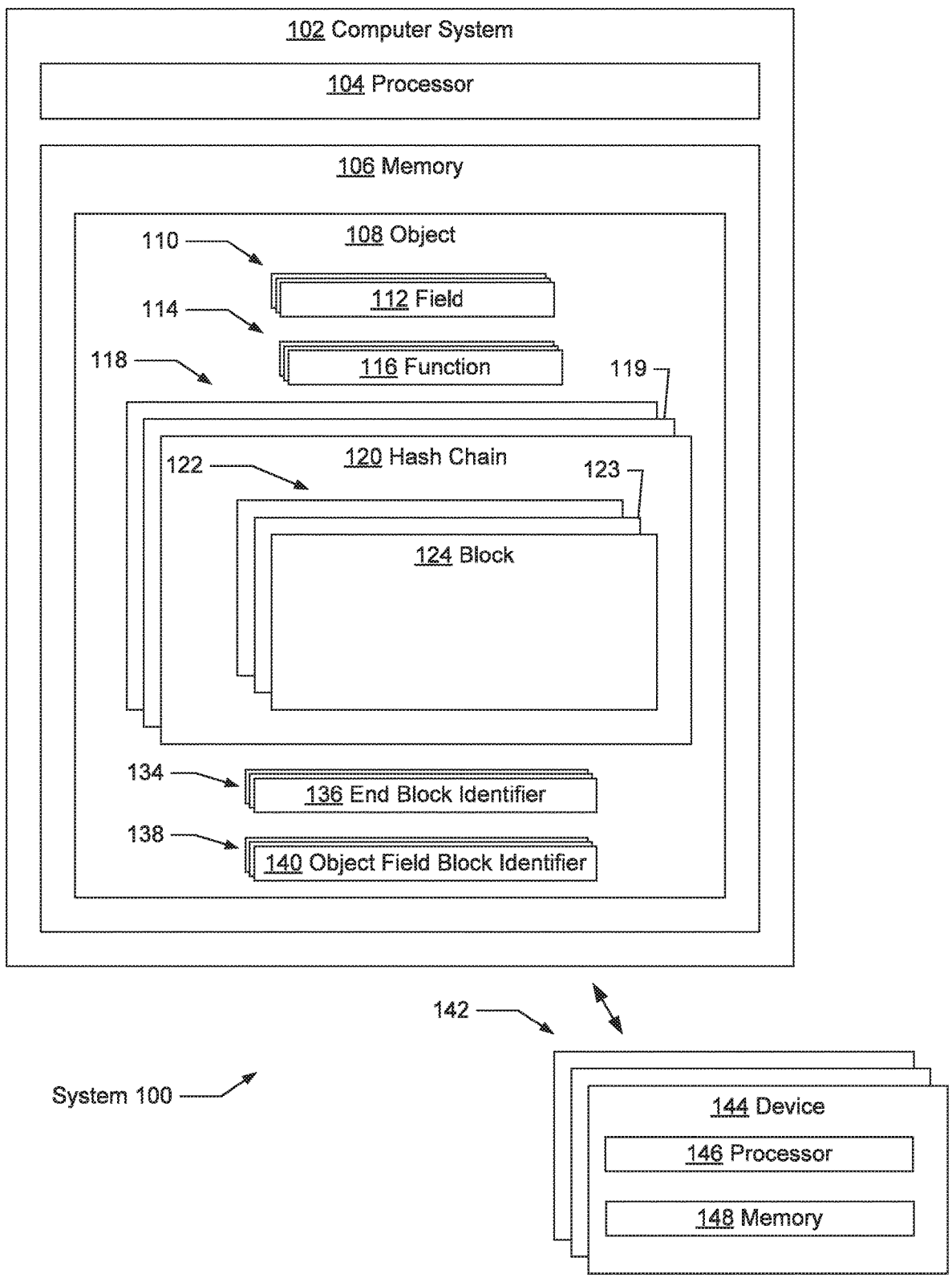

Specific embodiments will now be described in detail with reference to the accompanying figures. Like elements in the various figures are denoted by like reference numerals for consistency.

In the following detailed description of embodiments, numerous specific details are set forth in order to provide a more thorough understanding. However, it will be apparent to one of ordinary skill in the art that the invention may be practiced without these specific details. In other instances, well-known features have not been described in detail to avoid unnecessarily complicating the description.

Throughout the application, ordinal numbers (e.g., first, second, third, etc.) may be used as an adjective for an element (i.e., any noun in the application). The use of ordinal numbers is not to imply or create any particular ordering of the elements nor to limit any element to being only a single element unless expressly disclosed, such as by the use of the terms "before", "after", "single", and other such terminology. Rather, the use of ordinal numbers is to distinguish between the elements. By way of an example, a first element is distinct from a second element, and the first element may encompass more than one element and succeed (or precede) the second element in an ordering of elements.

In general, the data of programming objects that are loaded and running on computer systems (i.e., runtime objects) is routinely updated. The data updates may be stored in a hash chain to form an immutable record of the historical values of the data. The source code and corresponding class versions of programming objects are also routinely updated and different versions of the same object may store data using different types and different fields. In one or more embodiments, when the class version of a runtime object is updated (e.g., by updating the source code of the programming object) the pre-existing hash chain, which has data stored according to the previous class version of the programming object, is migrated to a new hash chain with data stored according to the updated class version of the programming object.

In general, embodiments that are in accordance with the disclosure include objects that store fields using hash chains. The object is migrated from a current version to a different version by generating a migration chain from an original hash chain of the object. The original hash chain is subdivided into sub chains. The sub chains may be processed concurrently. The sub chains are traversed starting from the end block to push the blocks from the sub chains into stacks. The blocks are popped off of the stacks in reverse order and the data is migrated to the appropriate version of the object to generate migration blocks. The migration blocks are appended to generate migration sub chains that correspond to the previously generated sub chains from the original hash chain. The migration sub chains are stored in a priority queue that maintains the order of the migration sub chains in the same order as the sub chains from the original hash chain. The priority queue is processed in order to generate the migration chain with container blocks that include the migration sub chains in the order provided for by the priority queue. Additional write requests to the object may be handled by generating a current sub chain that includes blocks generated in response to the additional write requests. The current sub chain is used to generate another container block that is appended to the migration chain after the other container blocks for the migration sub chains. After appending the container block for the current sub chain, subsequent write requests are handled normally by generating blocks that are appended to the migration chain.

FIG. 1A, FIG. 1B, FIG. 1C, FIG. 1D, FIG. 1E, and FIG. 1F show diagrams of the system (100) in accordance with one or more disclosed embodiments. The various elements of the system (100) may correspond to the computing system shown in FIG. 11A and FIG. 11B. In particular, the type, hardware, and computer readable medium for the various components of the system (100) is presented in reference to FIG. 11A and FIG. 11B. In one or more embodiments, one or more of the elements shown in FIGS. 1A, 1B, 1C, and 1D may be omitted, repeated, combined, and/or altered as shown from FIGS. 1A, 1B, 1C, and 1D. Accordingly, the scope of the present disclosure should not be considered limited to the specific arrangements shown in FIGS. 1A, 1B, 1C, 1D, 1E, and 1F.

Referring to FIG. 1A, the system (100) includes the computer system (102) and the set of devices (142). The set of devices (142) may interact with the object (108) of the computer system (102).

Figure 11A:
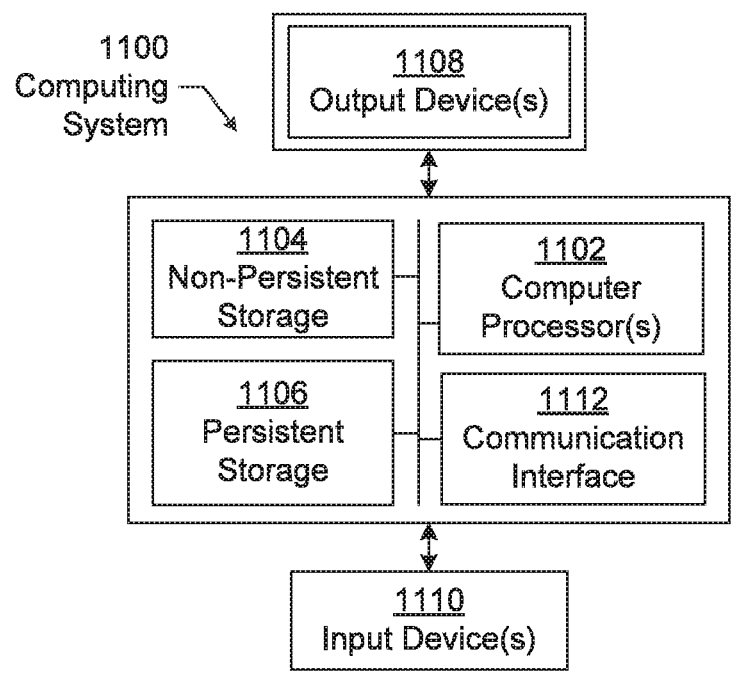
FIGS. 11A and 11B show computing systems in accordance with disclosed embodiments.
Figure 11B:
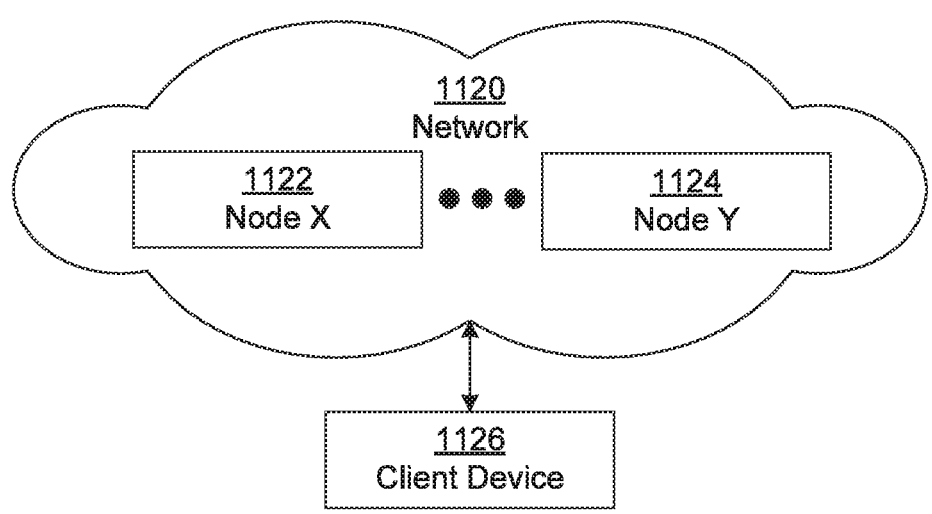

The computer system (102) is an embodiment of the computing system (1100) and nodes (1122, 1124) described in FIGS. 11A and 11B, respectively. Returning to FIG. 1A, the computer system (102) is a physical computing device with the computer processor (104) and the memory (106). The computer processor (104) executes the functions (114) of the object (108), which is stored in the memory (106).

The object (108) is a programming object resident within the memory (106) formed from a combination of variables, functions, and data structures. The object (108) includes one or more fields (110), functions (114), hash chains (118), end block identifiers (134), and object field block identifiers (138). The object (108) may be an object of a program written in an oriented programming language or may be a program written in a non-object oriented programming language. The object (108) may be written in any number of programming languages including Java, JavaScript, ANSI C, C++, Python, Perl, PHP, etc. In one or more embodiments, the object (108) is referred to as a runtime object when it is running on the computer processor (104). In one or more embodiments, the object (108) is defined by a class.

The fields (110) are the variables of the object (108) that identify the state of the object (108). The fields (110) have names and values that are stored within the hash chains (118) as field data sets. A field may be of any type including floating-point numbers, integers, characters, strings, other objects, etc. In one or more embodiments, the field (112) corresponds to the field data set (128 of FIGS. 1B and 1D), which is in the block (124) of the hash chain (120). The fields (110) include public fields that are accessible to objects and processes outside of the object (108) and includes private fields that are generally only accessible by the object (108). In one or more embodiments, the fields (110) include a private field for class identifier. In one or more embodiments, the class identifier is a universally unique identifier (UUID) that identifies the class of the object. In one or more embodiments, the fields (110) include a private field for a class version identifier that identifies the version of the class of the object.

The functions (114) are sequences of program instructions that perform specific tasks for the object (108). In one or more embodiments, the functions (114) include accessor functions that may read from and write to the fields (110) of the object (108), include migration functions to migrate blocks and chains from one version of the class to another version, and include functions to update the state of the object (108) by manipulating the values of the fields (110). The functions (114) include the function (116), which is an accessor function for the field (112) in one or more embodiments.

In one or more embodiments, the hash chains (118) include the hash chain (119) and the hash chain (120). The hash chains (118) record data that includes the values of the fields (110) of the object (108). The values of the fields (110) are recorded in the blocks (122) using a cryptographic hash function so that the historical values cannot be changed without detection. Suitable cryptographic hash algorithms for the cryptographic hash function used to store the values include Message Digest 5 (MD5), Secure Hash Algorithm (SHA), SHA-1, SHA-2, SHA-3, RACE Integrity Primitives Evaluation Message Digest (RIPEMD-160), Whirlpool, BLAKE, BLAKE2, etc. In one or more embodiments, the hash chain (119) is for a previous version of the object (108) and the hash chain (120) is a migration hash chain generated from the hash chain (119).

In one or more embodiments, the blocks (122) include the present and historical values of the fields (110). The sequence of the blocks (122) is immutable so that any change to the order of the blocks (122) or the values within the blocks (152) is detectable by recalculating and verifying the hash values generated for each of the blocks (122). In one or more embodiments, the blocks (122) include the block (123) and the block (124).

The block (124) is one of the blocks (122). In one or more embodiments, the block (124) is a field block or a container block, which are described in FIGS. 1B and 1C.

In one or more embodiments, the blocks (122) include serialized objects in the field data sets. In one or more embodiments, the serialized objects themselves include serialized objects, referred to as nested serialized objects or nested objects.

The end block identifiers (134) identify the end blocks of the hash chains (118). An end block of a hash chain is the most recently added block to the hash chain and is the block to which the next block of the hash chain is appended, which will then become the next end block. An end block is also referred to as a tail block. In one or more embodiments, the end block identifier (136) identifies the block (124) as the end block of the hash chain (120).

The object field block identifiers (138) identify blocks (122) within the hash chains (118). In one or more embodiments, the current state of the object (108) is identified with the object field block identifiers (138), which identify a set of blocks of the hash chains (118) that contain the current values for the fields (110). In one or more embodiments, the object field block identifier (140) of the object field block identifiers (138) identifies the block (124) as containing the current value for the field (112).

In one or more embodiments, the devices (142) include the device (144) and are used to access the object (108). In one or more embodiments, the device (144) is a computing system that executes one or more of programs on a physical computing device with processors (146) and memory (148), such as the computing system (1100) and nodes (1122, 1124) described in FIGS. 11A and 11B. The devices (142) are described further below in FIG. 1F.

Referring to FIG. 1B, the field block (124) is one of the blocks (122) of FIG. 1A that stores a field of the object (108). The field block (124) includes field data sets (126) and chain data sets (130), which are further described below in FIG. 1D and FIG. 1E.

Referring to FIG. 1C, the container block (123) is one of the blocks (122) of FIG. 1A. The container block (123) includes the hash chain (176) and the block identifiers (182).

In one or more embodiments, the hash chain (176) is a migration sub chain generated from a sub chain of the hash chain (119 of FIG. 1A) or is a current sub chain generated with blocks created after a migration process was started for the hash chain (119) and before the migration process ended, as further discussed below. The hash chain (176) includes the blocks (178).

The blocks (178) include the block (180). In one or more embodiments, the block (180) is a migration block generated from a block of the hash chain (119 of FIG. 1A) or is a current block generated from a write request received after migration of the hash chain (119) was started and before it was completed, as further discussed below.

The block identifiers (182) include the block identifier (184). In one or more embodiments, the block identifiers (182) identify the start block and end block of the hash chain (176). In one or more embodiments when the hash chain (176) is a migration sub chain, the block identifiers (182) include identifiers for the start block and end block of the sub chain within the hash chain (120 of FIG. 1A) that corresponds to the migration sub chain.

Referring to FIG. 1D, the field data sets (126) include the field data set (128) in accordance with one or more embodiments. In one or more embodiments, the field data sets (126) store the values of the fields (110 of FIG. 1A) of the object (108 of FIG. 1A). In one or more embodiments, the field data set (128) stores the value for the field (112 of FIG. 1A). The field data set (128) includes the field name (150), the field value (152), and the field block identifier (154). In one or more embodiments, the data that may be stored in a field data set includes the UUID of the object (108 of FIG. 1A), the class version of the object (108), a serialized form of the object (108), the fields (110), the functions (114), etc.

In one or more embodiments, the field name (150) identifies one of the fields (110) that is related to the field data set (128). In one or more embodiments, the field name (150) identifies the name of the field (112 of FIG. 1A).

In one or more embodiments, the field value (152) stores the value of a field of the object (108 of FIG. 1A). The field value (152) may be any data type including an integer, a floating point value, a character, string, another object, a serialized version of another object, etc. In one or more embodiments, the field value (152) is the value for the field (112 of FIG. 1A), which is identified by the field name (150).

In one or more embodiments, the field block identifier (154) identifies a block with a value for a field of the object (108 of FIG. 1A). In one or more embodiments, instead of storing the value of the field in a block, the field block identifier (154) identifies another block in one of the hash chains (118 of FIG. 1A) that includes the value of the field. For example, instead of storing the value of the field in the field value (152), the field block identifier (154) may be used to identify a different block that includes the field value and the field name.

Referring to FIG. 1E, the chain data sets (128) include the chain data set (131) and the chain data set (132) in accordance with one or more embodiments. The chain data sets (128) store hash chain information for the block (124 of FIG. 1A) that relates the block (124) to one or more of the hash chains (118 of FIG. 1A) of the object (108 of FIG. 1A). The block (124) may include chain data sets (128) that identify the hash chains (118) to which the block (124) belongs. As an example, the chain data set (132) links the block (124) to the hash chain (120 of FIG. 1A) and the chain data set (131) links the block (124) to a different hash chain of the hash chains (118 of FIG. 1A). The chain data set includes the chain identifier (156), the hash value (158), and the prior block identifier (160).

In one or more embodiments, the chain identifier (156) identifies one of the hash chains (118) to which the block (124) belongs. In one or more embodiments, the chain identifier (156) identifies that the block (124) belongs to the hash chain (120).

In one or more embodiments, the hash value (158) is a cryptographic hash value generated for the block (124). In one or more embodiments, the hash value (158) is generated by applying a cryptographic hash algorithm to the field data sets (126) for the block (124) and the hash value of the prior block in the hash chain identified with the chain identifier (156). As an example, when the block (124) includes a single field with the value stored in the field data set, then the field value and the hash value of the prior block are combined by appending the hash value to the field value to form a message. The cryptographic hash algorithm is then applied to the message. When the block (124) includes multiple field values, the multiple field values are combined with the prior block hash value, such as by appending the multiple field values together and then appending the prior block hash value to form the message that is then hashed with the cryptographic hash algorithm. When the block (124) includes field block identifiers, the field values may be retrieved using the field block identifiers to form the message or the field block identifiers may be used in place of the field values to form the message. The message used to generate the hash value (158) includes one or more field values and field block identifiers and includes the prior block hash value. The message is hashed with a cryptographic hash algorithm to form the hash value (158).

The prior block identifier (160) identifies a prior block in the hash chain of the block (124). In one or more embodiments, the prior block identifier may be the hash value of the prior block. In one or more embodiments, the prior block identifier (160) identifies the block (123) from FIG. 1A as the block that is immediately preceding the block (124) in the hash chain (120).

Figure 1F:
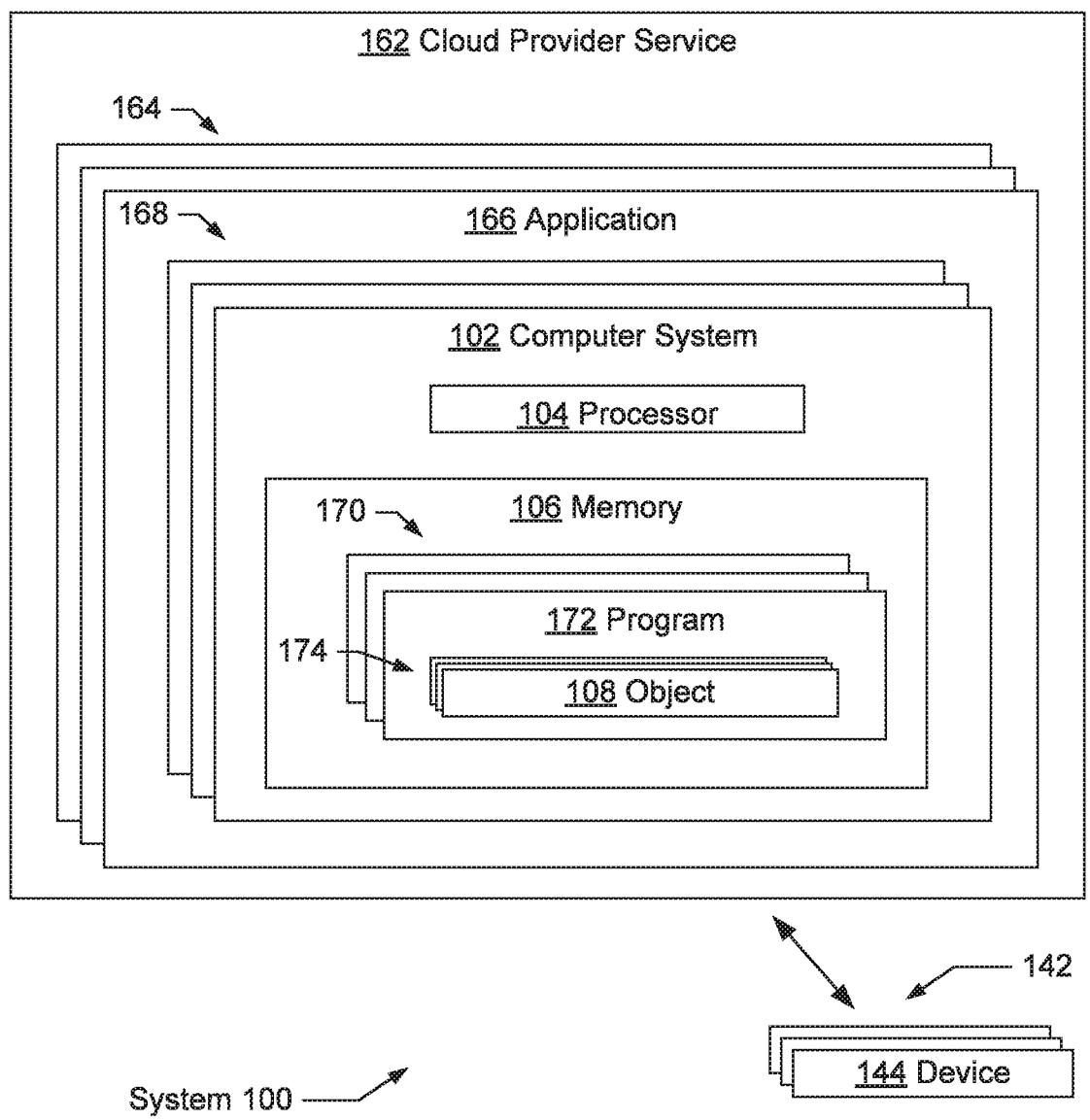

Referring to FIG. 1F, an example is shown where the cloud provider service (162) hosts the application (166), which includes the program (172), which includes the object (108). The cloud provider service (162) provides the information technology infrastructure for deploying distributed applications and web services, including the applications (164).

In one or more embodiments, the applications (164) include the application (166). In one or more embodiments, the application (166) is a distributed application that operates on the computer systems (168). As an example, the application (166) may be a web service, such as a website, and may be accessible to the devices (142) through a representational state transfer (RESTful) application programming interface (API).

In one or more embodiments, the computer systems (168) include the computer system (102). In one or more embodiments, the computer systems (168) include the programming instructions and data for executing the application (166).

The computer system (102) includes the computer processor (104) and the memory (106), as described in FIG. 1A. The memory (106) includes the programs (170).

The programs (170) execute a part of the application (166) on the computer system (102). The programs (170) may be written in any number of programming languages including Java, JavaScript, ANSI C, C++, Python, Perl, PHP, etc. The programs (170) include the program (172), which includes the objects (174), which include the object (108). Programs written in languages that are not object oriented may still be treated as programming objects, such as by using shell commands and scripts to interface the programs.

In one or more embodiments, the objects (174) form the program (172), which executes a part of the application (166). The objects (174) include the object (108), which is further described with respect to FIG. 1A.

The devices (142) include the device (144), which may interact with the application (166). As an example, when the application (166) is a website, the device (144) may use a web browser to access the website provided by the application (166), which uses the object (108).

Figure 2A:
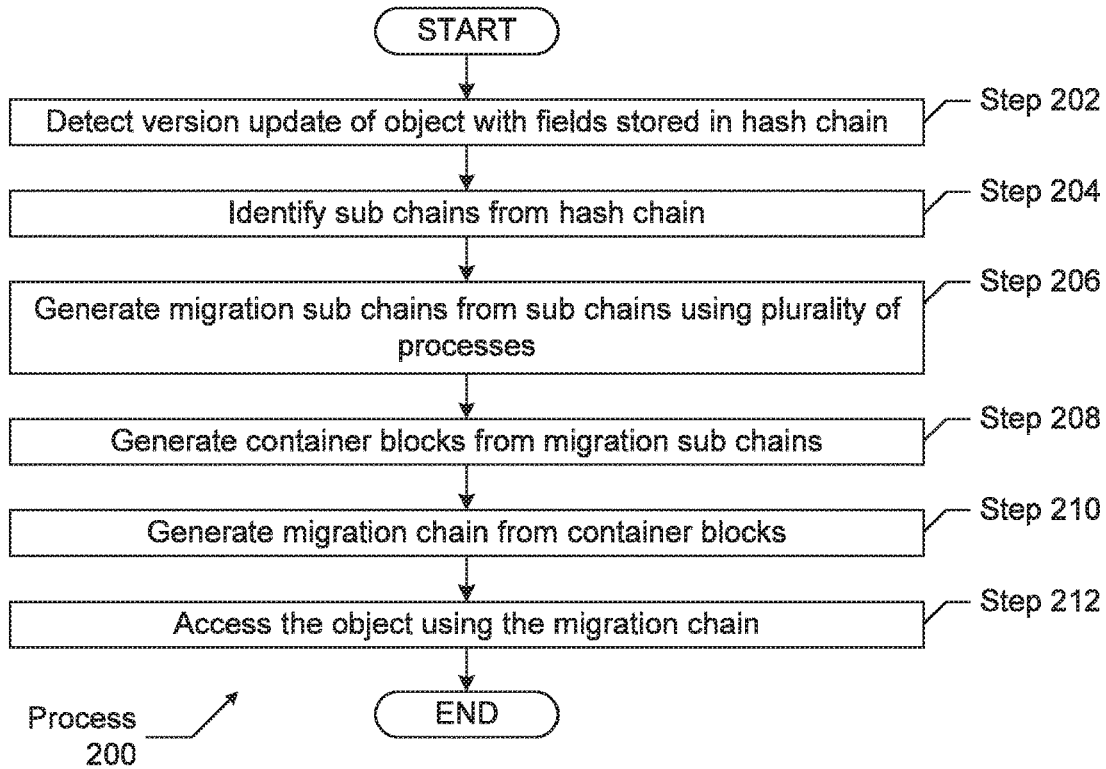
FIG. 2A, FIG. 2B, FIG. 3, and FIG. 4 show flow charts of methods in accordance with one or more embodiments of the present disclosure.

FIG. 2A shows a flowchart in accordance with one or more embodiments of the disclosure. The flowchart of FIG. 2A depicts a process (200) for migrating a hash chain to a different version. The process (200) may be implemented on one or more components of the system (100) of FIG. 1A. In one or more embodiments, one or more of the steps shown in FIG. 2A may be omitted, repeated, combined, and/or performed in a different order than the order shown in FIG. 2A. Accordingly, the scope of the present disclosure should not be considered limited to the specific arrangement of steps shown in FIG. 2A.

In Step 202, a version update of an object with fields stored in a hash chain is detected. In one or more embodiments, the version update is detected when a source code or object code file of the object is saved to a repository or deployed to a server. In one or more embodiments, the version update is detected in response to a selection of a developer that identifies with a user interface the version to which a hash chain should be migrated.

In Step 204, chains are identified from the hash chain. In one or more embodiments, the sub chains are identified by dividing the number of blocks in the hash chain by the number of processes that will be used to migrate the blocks of the hash chain. When the number of blocks is not evenly divisible by the number of processes, then one of the processes is assigned to migrate one more block than the other processes. For example, if the number of blocks is 17 and the number of processes is 5 then four of the processes would be assigned sub chains that include three blocks and a fifth process would be assigned a sub chain that includes four blocks since 17 is not evenly divisible by 5 (i.e., 17÷5=3.4). The sub chains are assigned serial numbers that identify the order of the sub chains with respect to the original hash chain. In one or more embodiments where the number of blocks is not evenly divided by the number of processes, the process that handles the latest blocks added to the hash chain, which are in the sub chain with the highest serial number, includes the extra block that covers the remainder from the division.

In Step 206, migration sub chains are generated from the sub chains using a plurality of processes. In one or more embodiments, the sub chains that were identified are assigned to the processes. After assigning a sub chain to a process, the process pushes the blocks of a sub chain sequentially onto a stack for the process. After pushing the blocks into a stack, the process pops a block off of the stack, migrates the block to the new version, and appends the migrated block to the migration sub chain. Popping a block off the stack, migrating the block, and appending the migrated block is repeated until the stack is empty. After generating the migration sub chain, the migration sub chain is sent to a priority queue with the serial number that was assigned to the sub chain from which the migration sub chain was generated. The serial number is used to indicate the order of the migration sub chain within the migration chain, which is the same as the order of the sub chain with the original hash chain.

In one or more embodiments, the migration of a block involves converting one or more data and data types stored with the block. For example, a prior version may store a variable as an integer and a subsequent version may store the same variable as a floating point value. Additionally, unit conversions may also be performed as needed, such as by converting feet and inches into meters or centimeters.

In Step 208, container blocks are generated from the migration sub chains. In one or more embodiments, the migration sub chains are removed from the priority queue using the order of the serial numbers so that the migration sub chains will be stored in the migration chain in the same order as the sub chains in the original hash chain. The sub chain with the lowest and next serial number is removed from the priority queue and a container block is created that includes the migration sub chain.

In Step 210, the migration chain is generated from container blocks. In one or more embodiments, the container blocks generated from the priority queue are appended to the migration chain in the order of the serial numbers that were assigned to the sub chains and passed to the migration sub chains without any skips. In one or more embodiments, the container block with the next serial number is appended to the migration chain as soon as it is ready, which may be after container blocks with subsequent serial numbers are ready. For example, when there are three migration sub chains with serial numbers 1, 2, and 3, the container block with the migration sub chain with the serial number 1 is the first container block appended to the migration chain, even if the container blocks for the migration sub chains with serial numbers 2 or 3 are ready prior to when the container block with the migration sub chain with the serial number 1 is ready. In one or more embodiments, a container block is generated from a current sub chain that includes current blocks generated in response to write requests that were received after the migration process was started, which is further described below.

In Step 212, the object is accessed using the migration chain. In one or more embodiments, the migration chain is accessed using read requests and write requests that trigger read functions and write functions.

In one or more embodiments, the first write request that is received after generating the migration chain generates a block that uses the current version of the object that is appended to the end container block of the migration chain. Subsequent write requests append additional blocks to the migration chain.

In one or more embodiments, read functions that are spawned by read requests traverse the migration chain similar to how the original hash chain was traversed, i.e., in reverse order starting from the end block of the migration chain. When a read function encounters a container block, the read function traverses the migration sub chain within the container block before proceeding to the next container block. The migration blocks within the container blocks are traversed and accessed in the same order as the blocks from the original hash chain.

Figure 2B:
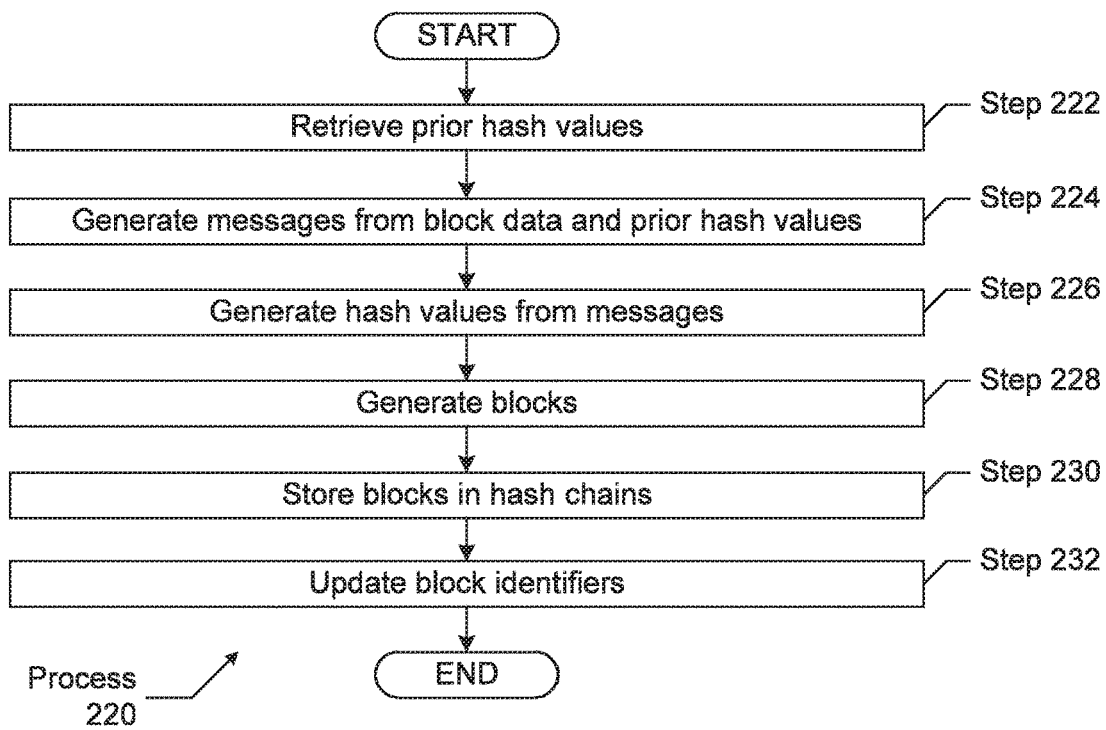

Referring to FIG. 2B, the flowchart of FIG. 2B depicts a process (220) for writing blocks to a hash chain. The process (220) may be implemented on one or more components of the system (100) of FIG. 1. In one or more embodiments, one or more of the steps shown in FIG. 2B may be omitted, repeated, combined, and/or performed in a different order than the order shown in FIG. 2B. Accordingly, the scope of the present disclosure should not be considered limited to the specific arrangement of steps shown in FIG. 2B.

In Step 222, prior hash values are retrieved. In one or more embodiments, the immediately prior blocks to the end blocks are identified from prior block identifiers within chain data sets of the end blocks. After identifying the prior blocks, the hash values from the chain data of the prior blocks are retrieved.

In Step 224, messages are generated from block data and prior hash values. The messages are the inputs to a cryptographic hash function. The messages are generated by combining data that will be stored in the new blocks with the hash values from the prior blocks.

For field blocks, the block data includes the field data sets. One or more of the field names, field values, and field block identifiers may be appended together with the hash value from a prior block to form a message, which may be in a binary or serialized format.

For container blocks, the block data includes the hash chain that will be stored within the container block. In one or more embodiments, the hash value from a prior block is appended together to the hash chain that will be stored within the container block to form the message used to generate the hash value of the container block being created.

The example below shows the message formed as a JSON formatted string from the field information provided in the write request and the hash value of a prior block.
{"Name":"John Maximus",
"Age":"21",
"Prior Hash Value":"B5AEAF478D38352B401DE55B240-CB5F245189A69"}
The field information identifies that the value of "John Maximus" is to be written to the field "Name" and the value of "21" is to be written to the field "Age". The hash value of "B5AEAF478D38352B401DE55B240CB5F245189A-69" from the prior block is also included in the message and was generated using the SHA-1 algorithm for this example.

In Step 226, hash values are generated from messages. For each message generated using block data and prior hash values, a hash value is generated using a cryptographic hash function. Continuing the example from above, the SHA-1 algorithm is used to generate the hash value shown below from the example message from Step 224.
SHA-1 hash value: 54F15577E4C6CAC4ACC8AD273F45-63FB9AAF08E0

In Step 228, blocks are generated. In one or more embodiments, container blocks are generated by creating migration sub chains from sub chains of a hash chain, as described in the process (200) of FIG. 2A. In one or more embodiments, field blocks are generated by collecting all of the information for the field data sets and chain data sets into the blocks. For example, a write request that updates two fields may include two field data sets, one for each updated field, and one or more chain data sets. The chain data sets include the hash chain identifiers, hash values, and prior block identifiers that are used to integrate the blocks into the hash chains. One or more of the field data sets in a block may include field block identifiers instead of field values, which may reduce the size of the block when the field values are large objects.

In one or more embodiments, when a block is generated that is a summary block, information for field data sets for all of the fields of the object may be included in the summary block. A summary block, or any other block, may include a mixture of field values and field block identifiers for the field data sets.

In Step 230, blocks are stored in the hash chains. In one or more embodiments, the blocks are stored in the hash chains by updating the end block identifiers to identify the newly generated blocks and append the newly generated blocks to their respective hash chains.

In Step 232, block identifiers are updated. In one or more embodiments that include object field block identifiers in the object, the object field block identifiers are updated to identify the correct blocks in the hash chains. For example, an object may include a set of object field block identifiers that identify the blocks in the hash chains that have the current field values for the fields of the object. Using the object field block identifiers reduces the amount of time to determine the current state of the object and the current values of the fields, as compared to determining the current state of the object and values of the fields by looking the field values by traversing multiple blocks of multiple hash chains.

Figure 3:
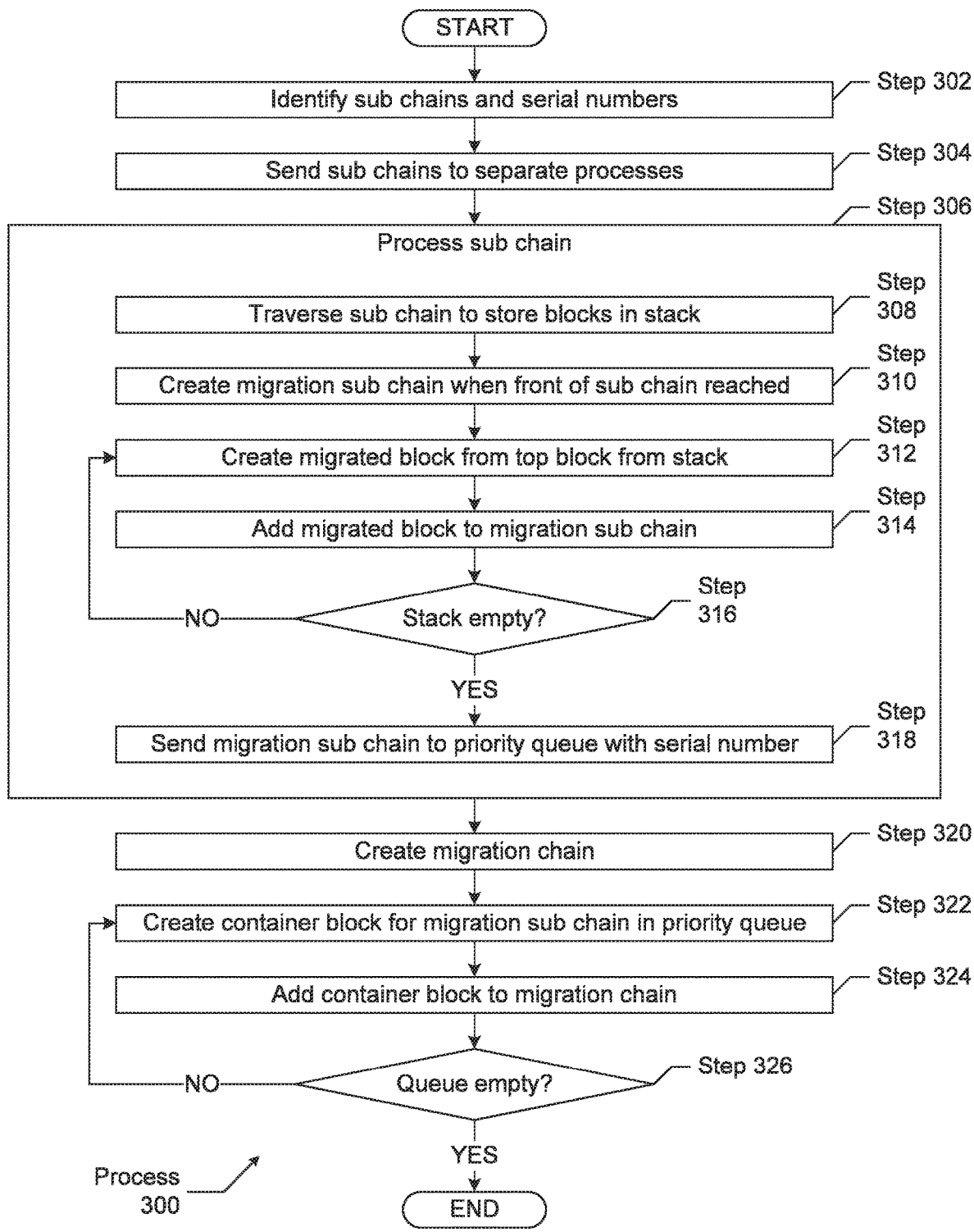

FIG. 3 shows a flowchart in accordance with one or more embodiments of the disclosure. The flowchart of FIG. 3 depicts a process (300) for migrating a hash chain to a current version and provides additional detail for one or more embodiments of the Steps 204 through 210 of FIG. 2A. The process (300) may be implemented on one or more components of the system (100) of FIG. 1A. In one or more embodiments, one or more of the steps shown in FIG. 3 may be omitted, repeated, combined, and/or performed in a different order than the order shown in FIG. 3. Accordingly, the scope of the present disclosure should not be considered limited to the specific arrangement of steps shown in FIG. 3.

In Step 302, sub chains and serial numbers are identified. The sub chains are identified with respect to a hash chain that is being migrated and include one or more blocks from the hash chain that is being migrated. In one or more embodiments, the sub chains are identified using block identifiers, including start block identifiers and end block identifiers for the sub chains. The serial numbers are consecutively assigned to the sub chains to identify the original order of the sub chains within the hash chain.

In Step 304, the sub chains are sent to separate processes. In one or more embodiments, there are as many processes as there are sub chains. A process receives the start and end block identifiers of a sub chain with the serial number of the sub chain.

In Step 306, separate sub chains are processed individually. In one or more embodiments, the separate processes perform the steps 308 through 318 in parallel for the separate sub chains, which reduces the time required for migrating the original hash chain.

In Step 308, the sub chain is traversed to store the blocks in a stack. The sub chain is traversed starting from the end block and proceeding towards the start block. In one or more embodiments, when a block is traversed, the block is copied and pushed onto a first in last out stack. In one or more embodiments, the block is copied by reference using a block identifier instead of making a duplicate copy of the block data. In additional embodiments, the block is migrated before being pushed to the stack so that the stack contains a collection of migrated blocks generated from the original sub chain.

In Step 310, a migration sub chain is created when the front of the sub chain is reached. The front of the sub chain is the start block of the sub chain and is identified by comparing the block identifier of the current block being traversed to the block identifier of the start block. When the current block identifier matches the start block identifier, the front of the sub chain has been reached and, after copying and pushing the start block to the stack, all of the blocks from the sub chain are in the stack and an empty hash chain is constructed that will become the migration sub chain.

In Step 312, a migrated block is created from the top block from the stack. The migrated block includes an updated version of the block data from the original block that was copied and pushed to the stack. The top block of the stack is the next block from the stack that will be processed and is the most recent block added to the stack. In one or more embodiments, the migrated block includes a pointer to the original block from the original hash chain.

In Step 314, the migrated block is added to the migration sub chain. In one or more embodiments, the first block removed from the stack, which corresponds to the start block of the original sub chain, is added to the empty hash chain that was previously created to form the genesis block of the migration sub chain. Subsequent blocks removed from the stack are appended to the migration sub chain to form the migration sub chain in the same order as the sub chain from the original hash chain.

In Step 316, a determination is made as to whether the stack is empty. When the stack is empty, the process proceeds to step 318. When the stack is not empty, the process repeats back to Step 312.

In Step 318, the migration sub chain is sent to a priority queue with the serial number. The serial number was assigned to the sub chain and is also assigned to the migration sub chain to identify the order of the migration sub chain within the migration chain that will be created. The order of the sub chains is the same as the order of the migration sub chains, which is identified by the serial numbers. The priority queue restricts access to the migration sub chains within the priority queue based on the serial numbers assigned to the migration sub chains. The migration sub chains within the priority queue are restricted to being accessed in the order identified by the serial numbers.

In Step 320, the migration chain is created. In one or more embodiments, the empty migration hash chain is created during the creation of the migration sub chains by the separate processes and is filled in on demand as the migration sub chains are completed while maintaining the correct order of the migration sub chains.

In Step 322, a container block is created for a migration sub chain in the priority queue. When the next migration sub chain is ready in the priority queue, the next migration sub chain is dequeued from the priority queue and inserted into a container block. The container block includes a hash value created from the migration sub chain from the priority queue and the hash value from the previous block of the migration chain, which is a previous container block. An exception is when the migration chain is empty, in which case the container block will become the genesis block of the migration chain and the prior hash value is a null or default value.

In Step 324, the container block is added to the migration chain. In one or more embodiments, the container block is added by appending the container block to the last block of the migration chain.

In Step 326, a determination is made as to whether the priority queue is empty. When the priority queue is empty, then the migration sub chains have been processed and the process ends. When the priority queue is not empty, additional migration sub chains remain and the process repeats back to Step 322.

Figure 4:
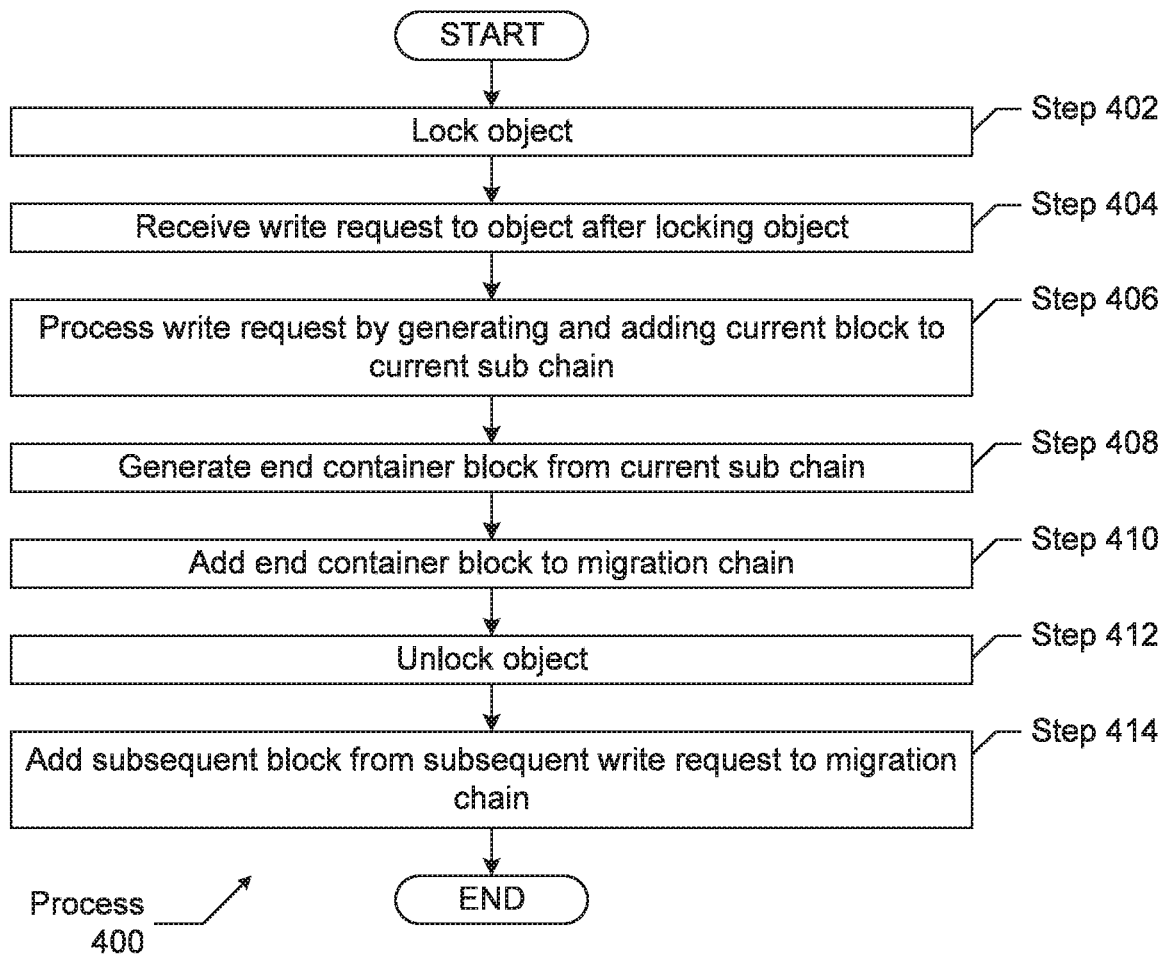

FIG. 4 shows a flowchart in accordance with one or more embodiments of the disclosure. The flowchart of FIG. 4 depicts a process (400) for handling write requests during hash chain migration. The process (400) may be implemented on one or more components of the system (100) of FIG. 1A. In one or more embodiments, one or more of the steps shown in FIG. 4 may be omitted, repeated, combined, and/or performed in a different order than the order shown in FIG. 4. Accordingly, the scope of the present disclosure should not be considered limited to the specific arrangement of steps shown in FIG. 4.

In Step 402, the object is locked. The object is locked to prevent access to the object from interfering with the migration of the object. In one or more embodiments, the object is locked after receiving a request from a developer to perform the migration or after identifying a new version of the object in a source code repository. In one or more embodiments, the object is locked by setting a lock flag (e.g., a Boolean value set to TRUE) that is scanned in response to receiving access requests. In one or more embodiments, read requests are queued until the lock is removed (such as by resetting the lock flag to a Boolean value of FALSE).

In Step 404, a write request is received after locking the object. In one or more embodiments, even though the object is locked to read requests, write requests are processed.

In Step 406, the write request is processed by generating and adding a current block to the current sub chain. In one or more embodiments, the current block is a block that stores object field data that is written to the object in response to a write request that is received while the object is locked for migration to a different object version. In one or more embodiments, the current block stores the data from the write request in the version that the hash chain is being migrated to. The current sub chain is a sub chain that includes current blocks that are generated while the object is locked during migration. The current blocks are added to the current sub chain in a fashion similar to how the blocks are added to the hash chain by using the hash values of prior blocks and the data to be stored in the current block to generate a hash value for the current block. The current blocks generated from the write requests are generated and appended to the current sub chain in the order that the write requests are received In Step 408, an end container block is generated from the current sub chain. In one or more embodiments, the end container block is generated after the migration chain has been completed for the blocks of the original hash chain. In one or more embodiments, a second lock, also referred to as a read write lock, is placed on the object. The read write lock prevents both read access and write access to the object while the end container block is generated from the current sub chain and until the migration chain is ready for access.

In Step 410, the end container block is added to the migration chain. In one or more embodiments, the migration chain includes the sub chains generated from the original hash chain but it does not yet include blocks that were generated from write requests received after the migration process began, which are included in the current sub chain in the end container block. The end container block is added to the migration chain in a similar fashion as other blocks being added to a hash chain by generating a hash value from the data of the end container block and from the hash value of a prior block. In one or more embodiments, the prior block is another container block that includes a migration sub chain with blocks migrated from the original hash chain.

In Step 412, the object is unlocked. In one or more embodiments, the read write lock and the first read lock are removed, such as by resetting the respective lock flags for the first and second locks to a Boolean value of FALSE.

In Step 414, subsequent blocks from subsequent write requests are added to the migration chain. In one or more embodiments, a first subsequent block generated from a first write request is appended to the end container block in the migration chain. Further subsequent blocks are successively appended one after the other to the subsequent block that was appended to the end container block to continue the migrated version of the hash chain for the object.

Figure 5A:
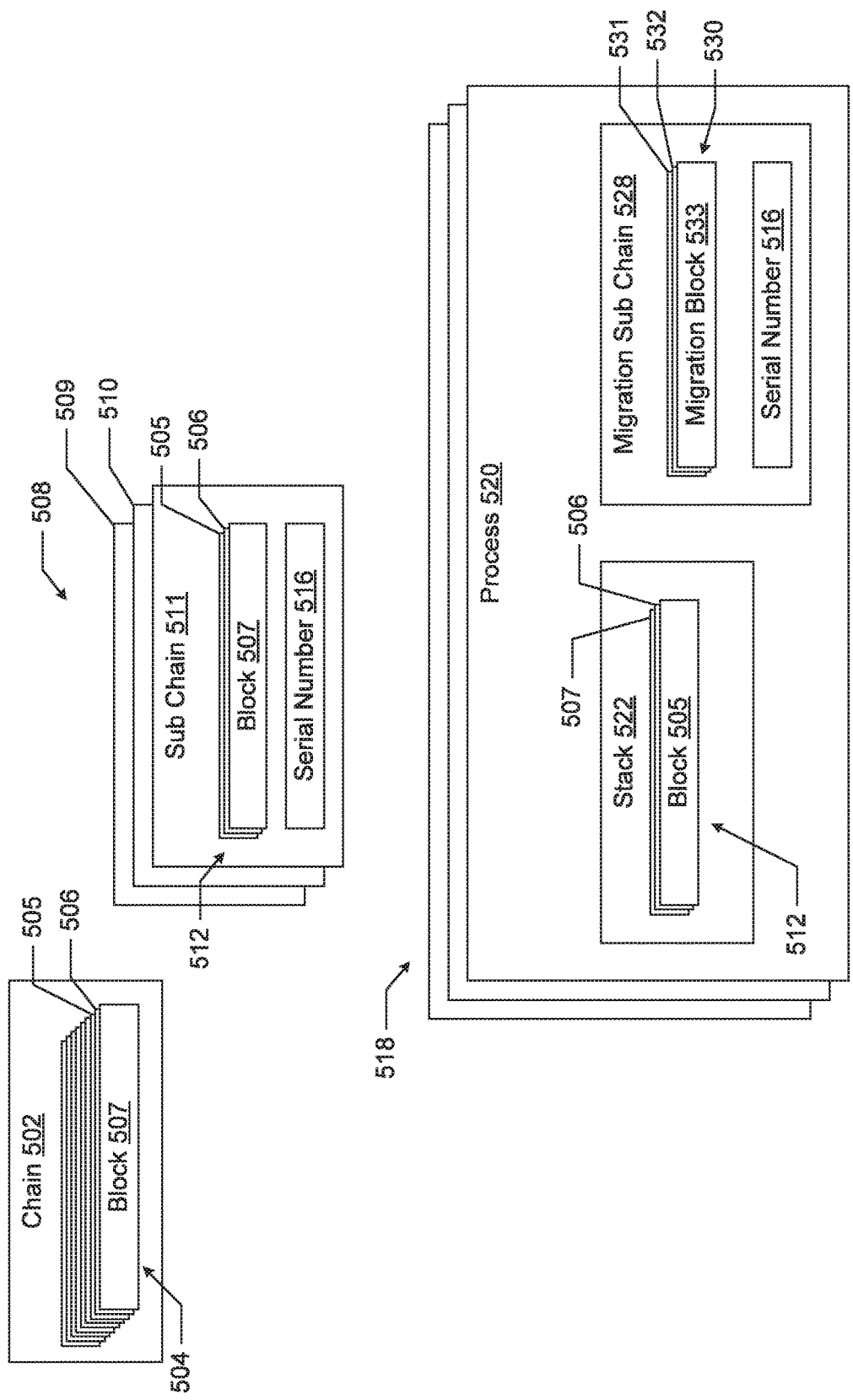

FIG. 5A and FIG. 5B show diagrams of data structures and processes used by a system, such as the system (100 of FIG. 1A), in accordance with one or more disclosed embodiments. In one or more embodiments, one or more of the elements shown in FIGS. 5A and 5B may be omitted, repeated, combined, and/or altered as shown from FIGS. 5A and 5B. Accordingly, the scope of the present disclosure should not be considered limited to the specific arrangements shown in FIGS. 5A and 5B.

Referring to FIG. 5A, the hash chain (502) includes the blocks (504), which include the blocks (505), (506), and (507). The blocks (504) may be field blocks or container blocks, as described above. The hash chain (502) is created to persist the values of the fields of an object, such as the object (108) of FIG. 1A. The block (507) is the most recently added block to the hash chain (502). The block (507) was appended to the block (506), which was appended to the block (505). The order of the blocks (504) and the data within the blocks (504) are immutable.

The sub chains (508) are formed from the hash chain (502). The sub chains (508) include the sub chains (509, 510, 511). The sub chain (511) includes the blocks (512) and the serial number (516). The blocks (512) are a subset of the blocks (504) from the hash chain (502). In one or more embodiments, the blocks (512) include the blocks (505), (506), and (507) from the hash chain (502).

The processes (518) interact with the sub chains (508) to generate migration sub chains, including the migration sub chain (528). The processes (518) include the process (520). In one or more embodiments, the process (520) interacts with the sub chain (511) to traverse the blocks (512) and push the blocks (512) into the stack (522), which effectively reverses the order in which the blocks will be traversed. After pushing the blocks (512) into stack (522), the process (520) successively pops the blocks (512) off of the stack (522) to generate the migration blocks (530). In one or more embodiments, the migration blocks (531), (532), and (533) in the migration sub chain (528) are migrated versions of the blocks (505), (506), and (507), respectively. For example, the process (520) pops the block (505) off of the stack (522), generates the migration block (531) from the block (505), and adds the migration block (531) to the migration sub chain (528) as the genesis block of the migration sub chain (528). The process (520) next pops the block (506) off of the stack (522), generates the migration block (532) from the block (506), and appends the migration block (532) to the migration block (531) in the migration sub chain (528). The migration block (533) is generated from the block (507) and appended to the migration block (532) in a similar fashion.

In order to append a migration block to the last block of the migration sub chain, the process (520) generates a hash value using the data from the migration block and the hash value of the proceeding block, which is described further above. For example, the migration block (532) includes a hash value that is generated from the data within the migration block (532) and from the hash value that was generated for the preceding migration block (531). The migration block (532) precedes the migration block (533) and the hash value generated for the migration block (532) is used to generate the hash value for the migration block (533).

In one or more embodiments, the serial number (516) is copied from the sub chain (511). Using the serial number (516) for the migration sub chain (528) indicates that the migration sub chain (528) corresponds to the sub chain (511). After generating the migration sub chain (528), the process (520) sends the migration sub chain (528) to the priority queue (536) of FIG. 5B.

Referring to FIG. 5B, the priority queue (536) includes the migration sub chains (525) that were generated by the processes (518). The migration sub chains (525) include the individual migration sub chains (526), (527), and (528). The migration sub chains (525) are ordered within the priority queue (536) based on their respective serial numbers.

The priority queue (536) includes the current sub chain (548). The blocks (550) of the current sub chain (540) are generated in response to write access requests that are received after the migration process has begun and blocks are no longer being appended to the original hash chain (502). The serial number (554) for the current sub chain (548) identifies that the current sub chain (548) should be subsequent to the migration sub chain (528) when the migration chain (556) is generated from the sub chains within the priority queue (536).

The migration chain (556) includes the container blocks (558), which include the individual container blocks (559), (560), and (561). The container block (559) is the genesis block of the migration chain (556) and includes the migration sub chain (526). The container block (560) includes the migration sub chain (527), is appended to the container block (559), and includes a hash value generated from the hash value from the container block (559). The container block (561) is appended to the container block (560), includes the migration sub chain (528), and includes a hash value generated from the hash value from the container block (560).

After the migration sub chains (525) are added to the migration chain (556) with the container blocks (558), the current sub chain (548) is added to the migration chain (556). The current sub chain (548) is added to the migration chain (556) by generating the container block (564) and appending the container block (564) to the container block (561). The hash value for the container block (564) is generated from the current sub chain (548) and from the hash value generated for the container block (561).

After the current sub chain (548) is added to the migration chain (556) the subsequent blocks (568) are added to the migration chain (556) in response to write requests received by the object associated with the migration chain (556). The subsequent blocks (568) include the individual subsequent blocks (569), (570), and (571). The subsequent block (569) is appended to the container block (564). The subsequent block (570) is appended to the subsequent block (569) and the subsequent block (571) is appended to the subsequent block (570).

FIG. 6, FIG. 7, FIG. 8, FIG. 9, and FIG. 10 show diagrams of data structures used by a system, such as the system (100 of FIG. 1A), in accordance with one or more disclosed embodiments. In one or more embodiments, one or more of the elements shown in FIGS. 6, 7, 8, 9, and 10 may be omitted, repeated, combined, and/or altered as shown from FIGS. 6, 7, 8, 9, and 10. Accordingly, the scope of the present disclosure should not be considered limited to the specific arrangements shown in FIGS. 6, 7, 8, 9, and 10. FIG. 6 shows and original hash chain (600) before being migrated. FIGS. 7 and 8 show migration sub chains (700) and (800) that are generated from the hash chain (600). FIG. 9 shows a current sub chain (900) generated in response to write access requests received during the migration of the hash chain (600). FIG. 10 shows the migration chain (1000) that includes container blocks for the migration sub chains (700) and (800), the current sub chain (900), and subsequent blocks.

Referring to FIG. 6, the hash chain (600) includes the blocks (602, 604, 606, 608, 610, 612). The blocks (602, 604, 606, 608, 610, 612) were sequentially and immutably added to the hash chain (600) in response to write access requests received by the object related to the hash chain (600).

The blocks (602, 604, 606, 608, 610, 612) include the block identifiers (614, 626, 638, 650, 662, 674), the previous block identifiers (616, 628, 640, 652, 664, 676), the previous hash identifiers (618, 630, 642, 654, 666, 678), the hash values (620, 632, 644, 656, 668, 680), the data (622, 634, 646, 658, 670, 682), and the version identifiers (624, 636, 648, 660, 672, 684).

The block identifiers (614, 626, 638, 650, 662, 674) respectively identify the blocks (614, 626, 638, 650, 662, 674) using the text labels Block 0, Block 1, Block 2, Block 3, Block 4, Block 5.

The previous block identifiers (616, 628, 640, 652, 664, 676) identify the block that is prior to a given block. For example, block (604) is labeled as Block 1 and the previous block identifier (628) identifies that the block (602) labeled as Block 0 is the prior block to the block (604). Block (602) is labeled as Block 0 and is the genesis block, which may be determined from the previous block identifier (616) identifying the same block (Block 0) as the prior block.

The previous hash identifiers (618, 630, 642, 654, 666, 678) identify the hash value of the previous block. For example, the previous hash identifier (630) indicates that the hash value labeled Hash 0 is the previous hash value. The previous hash value labeled Hash 0 was used with the data (634) to generate the hash value (632), which labeled has Hash 1.

The hash values (620, 632, 644, 656, 668, 680) are the hash values generated for the respective blocks (602, 604, 606, 608, 610, 612) from the previous hash values identified with the previous identifiers (618, 630, 642, 654, 666, 678) and from the data (622, 634, 646, 658, 670, 682) that is respectively stored in the blocks (602, 604, 606, 608, 610, 612). The hash values (620, 632, 644, 656, 668, 680) of the hash chain (600) are sequentially labeled Hash 0, Hash 1, Hash 2, Hash 3, Hash 4, and Hash 5, respectively, and are generated before the hash values in the hash chains (700, 800, 900, 1000) of FIGS. 7, 8, 9, and 10.

The data (622, 634, 646, 658, 670, 682) is respectively labeled as Block 0 Data, Block 1 Data, Block 2 Data, Block 3 Data, Block 4 Data, and Block 5 Data. The data stored in a block includes values from a write access request that writes to the fields of an object that uses the hash chain (600). Additionally, when the hash chain (600) is a migration chain that is migrated from a prior version of the object, the data may include container blocks with migration sub chains generated from a different version of the object.

The version identifiers (624, 636, 648, 660, 672, 684) indicate that the data (622, 634, 646, 658, 670, 682) in the blocks (602, 604, 606, 608, 610, 612) was stored using Version 1 of the object.

Referring to FIG. 7, the migration sub chain (700) is a hash chain created from a sub chain of the hash chain (600) of FIG. 6. The migration sub chain (700) includes the migration blocks (702, 704, 706). The migration blocks (702, 704, 706) include the block identifiers (708, 720, 732), the previous block identifiers (710, 722, 734), the previous hash identifiers (712, 724, 736), the hash values (714, 726, 738), the migration data (716, 728, 740), and the version identifiers (718, 730, 742).

The migration sub chain (700) is generated from a sub chain that includes the blocks (602, 604, 606) from the hash chain (600) of FIG. 6. The migration blocks (702, 704, 706) are migrated versions of the blocks (602, 604, 606) from the hash chain (600) and migrated from Version 1 in the hash chain (600) to Version 2 in the hash chain and (700).

Referring to FIG. 8, the migration sub chain (800) is a hash chain created from a sub chain of the hash chain (600) of FIG. 6. The migration sub chain (800) includes the migration blocks (802, 804, 806). The migration blocks (802, 804, 806) include the block identifiers (808, 820, 832), the previous block identifiers (810, 822, 834), the previous hash identifiers (812, 824, 836), the hash values (814, 826, 838), the migration data (816, 828, 840), and the version identifiers (818, 830, 842).

The migration sub chain (800) is generated from a sub chain that includes the blocks (608, 610, 612) from the hash chain (600) of FIG. 6. The migration blocks (802, 804, 806) are migrated versions of the blocks (608, 610, 612) from the hash chain (600) and migrated from Version 1 in the hash chain (600) to Version 2 in the hash chain and (800).

Referring to FIG. 9, the current sub chain (900) is a hash chain created in response to write access requests received during the migration process. The current sub chain (900) includes the current blocks (902, 904, 906). The current blocks (902, 904, 906) include the block identifiers (908, 920, 932), the previous block identifiers (910, 922, 934), the previous hash identifiers (912, 924, 936), the hash values (914, 926, 938), the current block data (916, 928, 940), and the version identifiers (918, 930, 942).

Referring to FIG. 10, the migration chain (1000) is a hash chain that includes the migration sub chains (700, 800), the current sub chain (900), and subsequent blocks (1008, 1010). The subsequent blocks (1008, 1010) are created in response to write access requests received after the migration process is completed.

The migration chain (1000) includes the container blocks (1002, 1004, 1006). The container blocks (1002, 1004, 1006) include the block identifiers (1012, 1024, 1036), the previous block identifiers (1014, 1026, 1038), the previous hash identifiers (1016, 1028, 1040), the hash values (1018, 1030, 1042), the block data (1020, 1032, 1044), and the version identifiers (1022, 1034, 1046).

The block data (1020, 1032) of the container blocks (1002, 1004), respectively, include the migration sub chains (700, 800) of FIGS. 7 and 8. The block data (1044) of the container block (1006) includes the current sub chain (900) of FIG. 9.

The hash values in the hash chains (700, 800, 900, 1000) may be generated on demand. In one or more embodiments, hash values in the blocks of the migration chain are generated after a first set of hash values from the migration and current sub chains and are generated before a second set of hash values from the migration and current sub chains. For example the hash value (1018) of the container block (1002), which is labeled Hash 13 is generated after the hash values (714, 726, 738, 814, 826, 914, 926) from the migration and current sub chains (700, 800, 900) and is generated before the hash values (838, 938) from the migration and current sub chains (800, 900). Additionally, the hash value (1018) is generated before the hash values (1030, 1042, 1054, 1066) of the container and subsequent blocks (1004, 1006, 1008, 1010).

Embodiments may be implemented on a computing system. Any combination of mobile, desktop, server, router, switch, embedded device, or other types of hardware may be used. For example, as shown in FIG. 11A, the computing system (1100) may include one or more computer processors (1102), non-persistent storage (1104) (e.g., volatile memory, such as random access memory (RAM), cache memory), persistent storage (1106) (e.g., a hard disk, an optical drive such as a compact disk (CD) drive or digital versatile disk (DVD) drive, a flash memory, etc.), a communication interface (1112) (e.g., Bluetooth interface, infrared interface, network interface, optical interface, etc.), and numerous other elements and functionalities.

The computer processor(s) (1102) may be an integrated circuit for processing instructions. For example, the computer processor(s) may be one or more cores or micro-cores of a processor. The computing system (1100) may also include one or more input devices (1110), such as a touchscreen, keyboard, mouse, microphone, touchpad, electronic pen, or any other type of input device.

The communication interface (1112) may include an integrated circuit for connecting the computing system (1100) to a network (not shown) (e.g., a local area network (LAN), a wide area network (WAN) such as the Internet, mobile network, or any other type of network) and/or to another device, such as another computing device.

Further, the computing system (1100) may include one or more output devices (1108), such as a screen (e.g., a liquid crystal display (LCD), a plasma display, touchscreen, cathode ray tube (CRT) monitor, projector, or other display device), a printer, external storage, or any other output device. One or more of the output devices may be the same or different from the input device(s). The input and output device(s) may be locally or remotely connected to the computer processor(s) (1102), non-persistent storage (1104), and persistent storage (1106). Many different types of computing systems exist, and the aforementioned input and output device(s) may take other forms.

Software instructions in the form of computer readable program code to perform embodiments of the disclosure may be stored, in whole or in part, temporarily or permanently, on a non-transitory computer readable medium such as a CD, DVD, storage device, a diskette, a tape, flash memory, physical memory, or any other computer readable storage medium. Specifically, the software instructions may correspond to computer readable program code that, when executed by a processor(s), is configured to perform one or more embodiments of the disclosure.

The computing system (1100) in FIG. 11A may be connected to or be a part of a network. For example, as shown in FIG. 11B, the network (1120) may include multiple nodes (e.g., node X (1122), node Y (1124)). Nodes may correspond to a computing system, such as the computing system shown in FIG. 11A, or a group of nodes combined may correspond to the computing system shown in FIG. 11A. By way of an example, embodiments of the disclosure may be implemented on a node of a distributed system that is connected to other nodes. By way of another example, embodiments of the disclosure may be implemented on a distributed computing system having multiple nodes, where portions of the disclosure may be located on a different node within the distributed computing system. Further, one or more elements of the aforementioned computing system (1100) may be located at a remote location and connected to the other elements over a network.

Although not shown in FIG. 11B, the node may correspond to a blade in a server chassis that is connected to other nodes via a backplane. By way of another example, the node may correspond to a server in a data center. By way of another example, the node may correspond to a computer processor or micro-core of a computer processor with shared memory and/or resources.

The nodes (e.g., node X (1122), node Y (1124)) in the network (1120) may be configured to provide services for a client device (1126). For example, the nodes may be part of a cloud computing system. The nodes may include functionality to receive requests from the client device (1126) and transmit responses to the client device (1126). The client device (1126) may be a computing system, such as the computing system shown in FIG. 11A. Further, the client device (1126) may include and/or perform at least a portion of one or more embodiments of the disclosure.

The computing system or group of computing systems described in FIGS. 11A and 11B may include functionality to perform a variety of operations disclosed herein. For example, the computing system(s) may perform communication between processes on the same or different system. A variety of mechanisms, employing some form of active or passive communication, may facilitate the exchange of data between processes on the same device. Examples representative of these inter-process communications include, but are not limited to, the implementation of a file, a signal, a socket, a message queue, a pipeline, a semaphore, shared memory, message passing, and a memory-mapped file. Further details pertaining to a couple of these non-limiting examples are provided below.

Based on the client-server networking model, sockets may serve as interfaces or communication channel endpoints enabling bidirectional data transfer between processes on the same device. Foremost, following the client-server networking model, a server process (e.g., a process that provides data) may create a first socket object. Next, the server process binds the first socket object, thereby associating the first socket object with a unique name and/or address. After creating and binding the first socket object, the server process then waits and listens for incoming connection requests from one or more client processes (e.g., processes that seek data). At this point, when a client process wishes to obtain data from a server process, the client process starts by creating a second socket object. The client process then proceeds to generate a connection request that includes at least the second socket object and the unique name and/or address associated with the first socket object. The client process then transmits the connection request to the server process. Depending on availability, the server process may accept the connection request, establishing a communication channel with the client process, or the server process, busy in handling other operations, may queue the connection request in a buffer until server process is ready. An established connection informs the client process that communications may commence. In response, the client process may generate a data request specifying the data that the client process wishes to obtain. The data request is subsequently transmitted to the server process. Upon receiving the data request, the server process analyzes the request and gathers the requested data. Finally, the server process then generates a reply including at least the requested data and transmits the reply to the client process. The data may be transferred, more commonly, as datagrams or a stream of characters (e.g., bytes).

Shared memory refers to the allocation of virtual memory space in order to substantiate a mechanism for which data may be communicated and/or accessed by multiple processes. In implementing shared memory, an initializing process first creates a shareable segment in persistent or non-persistent storage. Post creation, the initializing process then mounts the shareable segment, subsequently mapping the shareable segment into the address space associated with the initializing process. Following the mounting, the initializing process proceeds to identify and grant access permission to one or more authorized processes that may also write and read data to and from the shareable segment. Changes made to the data in the shareable segment by one process may immediately affect other processes, which are also linked to the shareable segment. Further, when one of the authorized processes accesses the shareable segment, the shareable segment maps to the address space of that authorized process. Often, only one authorized process may mount the shareable segment, other than the initializing process, at any given time.

Other techniques may be used to share data, such as the various data described in the present application, between processes without departing from the scope of the disclosure. The processes may be part of the same or different application and may execute on the same or different computing system.

Rather than or in addition to sharing data between processes, the computing system performing one or more embodiments of the disclosure may include functionality to receive data from a user. For example, in one or more embodiments, a user may submit data via a graphical user interface (GUI) on the user device. Data may be submitted via the graphical user interface by a user selecting one or more graphical user interface widgets or inserting text and other data into graphical user interface widgets using a touchpad, a keyboard, a mouse, or any other input device. In response to selecting a particular item, information regarding the particular item may be obtained from persistent or non-persistent storage by the computer processor. Upon selection of the item by the user, the contents of the obtained data regarding the particular item may be displayed on the user device in response to the user's selection.

By way of another example, a request to obtain data regarding the particular item may be sent to a server operatively connected to the user device through a network. For example, the user may select a uniform resource locator (URL) link within a web client of the user device, thereby initiating a Hypertext Transfer Protocol (HTTP) or other protocol request being sent to the network host associated with the URL. In response to the request, the server may extract the data regarding the particular selected item and send the data to the device that initiated the request. Once the user device has received the data regarding the particular item, the contents of the received data regarding the particular item may be displayed on the user device in response to the user's selection. Further to the above example, the data received from the server after selecting the URL link may provide a web page in Hyper Text Markup Language (HTML) that may be rendered by the web client and displayed on the user device.

Once data is obtained, such as by using techniques described above or from storage, the computing system, in performing one or more embodiments of the disclosure, may extract one or more data items from the obtained data. For example, the extraction may be performed as follows by the computing system in FIG. 11A. First, the organizing pattern (e.g., grammar, schema, layout) of the data is determined, which may be based on one or more of the following: position (e.g., bit or column position, Nth token in a data stream, etc.), attribute (where the attribute is associated with one or more values), or a hierarchical/tree structure (consisting of layers of nodes at different levels of detail-such as in nested packet headers or nested document sections). Then, the raw, unprocessed stream of data symbols is parsed, in the context of the organizing pattern, into a stream (or layered structure) of tokens (where tokens may have an associated token "type").

Next, extraction criteria are used to extract one or more data items from the token stream or structure, where the extraction criteria are processed according to the organizing pattern to extract one or more tokens (or nodes from a layered structure). For position-based data, the token(s) at the position(s) identified by the extraction criteria are extracted. For attribute/value-based data, the token(s) and/or node(s) associated with the attribute(s) satisfying the extraction criteria are extracted. For hierarchical/layered data, the token(s) associated with the node(s) matching the extraction criteria are extracted. The extraction criteria may be as simple as an identifier string or may be a query presented to a structured data repository (where the data repository may be organized according to a database schema or data format, such as XML).

The extracted data may be used for further processing by the computing system. For example, the computing system of FIG. 11A, while performing one or more embodiments of the disclosure, may perform data comparison. Data comparison may be used to compare two or more data values (e.g., A, B). For example, one or more embodiments may determine whether $A>B$, $A=B$, $A!=B$, $A<B$, etc. The comparison may be performed by submitting A, B, and an opcode specifying an operation related to the comparison into an arithmetic logic unit (ALU) (i.e., circuitry that performs arithmetic and/or bitwise logical operations on the two data values). The ALU outputs the numerical result of the operation and/or one or more status flags related to the numerical result. For example, the status flags may indicate whether the numerical result is a positive number, a negative number, zero, etc. By selecting the proper opcode and then reading the numerical results and/or status flags, the comparison may be executed. For example, in order to determine if $A>B$, B may be subtracted from A (i.e., $A-B$), and the status flags may be read to determine if the result is positive (i.e., if $A>B$, then $A-B>0$). In one or more embodiments, B may be considered a threshold, and A is deemed to satisfy the threshold if $A=B$ or if $A>B$, as determined using the ALU. In one or more embodiments of the disclosure, A and B may be vectors, and comparing A with B requires comparing the first element of vector A with the first element of vector B, the second element of vector A with the second element of vector B, etc. In one or more embodiments, if A and B are strings, the binary values of the strings may be compared.

The computing system in FIG. 11A may implement and/or be connected to a data repository. For example, one type of data repository is a database. A database is a collection of information configured for ease of data retrieval, modification, re-organization, and deletion. Database Management System (DBMS) is a software application that provides an interface for users to define, create, query, update, or administer databases.

The user, or software application, may submit a statement or query into the DBMS. Then the DBMS interprets the statement. The statement may be a select statement to request information, update statement, create statement, delete statement, etc. Moreover, the statement may include parameters that specify data, or data container (database, table, record, column, view, etc.), identifier(s), conditions (comparison operators), functions (e.g. join, full join, count, average, etc.), sort (e.g. ascending, descending), or others. The DBMS may execute the statement. For example, the DBMS may access a memory buffer, a reference or index a file for read, write, deletion, or any combination thereof, for responding to the statement. The DBMS may load the data from persistent or non-persistent storage and perform computations to respond to the query. The DBMS may return the result(s) to the user or software application.

The computing system of FIG. 11A may include functionality to present raw and/or processed data, such as results of comparisons and other processing. For example, presenting data may be accomplished through various presenting methods. Specifically, data may be presented through a user interface provided by a computing device. The user interface may include a GUI that displays information on a display device, such as a computer monitor or a touchscreen on a handheld computer device. The GUI may include various GUI widgets that organize what data is shown as well as how data is presented to a user. Furthermore, the GUI may present data directly to the user, e.g., data presented as actual data values through text, or rendered by the computing device into a visual representation of the data, such as through visualizing a data model.

For example, a GUI may first obtain a notification from a software application requesting that a particular data object be presented within the GUI. Next, the GUI may determine a data object type associated with the particular data object, e.g., by obtaining data from a data attribute within the data object that identifies the data object type. Then, the GUI may determine any rules designated for displaying that data object type, e.g., rules specified by a software framework for a data object class or according to any local parameters defined by the GUI for presenting that data object type. Finally, the GUI may obtain data values from the particular data object and render a visual representation of the data values within a display device according to the designated rules for that data object type.

Data may also be presented through various audio methods. In particular, data may be rendered into an audio format and presented as sound through one or more speakers operably connected to a computing device.

Data may also be presented to a user through haptic methods. For example, haptic methods may include vibrations or other physical signals generated by the computing system. For example, data may be presented to a user using a vibration generated by a handheld computer device with a predefined duration and intensity of the vibration to communicate the data.

The above description of functions presents only a few examples of functions performed by the computing system of FIG. 11A and the nodes and/or client device in FIG. 11B. Other functions may be performed using one or more embodiments of the disclosure.

While the disclosure has been described with respect to a limited number of embodiments, those skilled in the art, having benefit of this disclosure, will appreciate that other embodiments may be devised which do not depart from the scope of the disclosure. Accordingly, the scope of the disclosure should be limited only by the attached claims.

What is claimed is:

1. A method comprising:
    detecting a version update from a first version of an object to a second version of the object, wherein the object is a programming object that includes a hash chain that stores a plurality of fields of the object using the first version of the object;
    identifying a plurality of sub chains from the hash chain;
    generating a plurality of migration sub chains, using the second version of the object, from the plurality of sub chains using a plurality of processes;
    generating a plurality of container blocks including the plurality of migration sub chains;
    generating a migration chain from the plurality of container blocks; and
    accessing the second version of the object using the migration chain.

2. The method of claim 1,
    wherein the plurality of sub chains includes a sub chain,
    wherein the plurality of migration sub chains includes a migration sub chain,
    wherein the plurality of processes includes a process and includes a plurality of stacks,
    wherein the plurality of stacks includes a stack, and
    wherein the plurality of container blocks includes a container block.

3. The method of claim 2, further comprising:
    generating the migration sub chain from the sub chain by:
        traversing the sub chain and storing blocks from the sub chain in the stack, wherein an order of the sub chain with respect to the plurality of sub chains is identified with a serial number of a plurality of serial numbers;
        creating the migration sub chain when a front of the sub chain is reached;
        creating a migration block from a top block of the stack; and
        adding the migration block to the migration sub chain and removing the top block from the stack.

4. The method of claim 3, further comprising:
    when the stack includes a next block, setting the next block as the top block and repeating the steps of creating the migration block from the top block and adding the migration block to the migration sub chain.

5. The method of claim 3, further comprising:
    sending the migration sub chain to a priority queue with the serial number.

6. The method of claim 2, further comprising:
    generating the migration chain by:
        creating the container block, wherein the container block includes the migration sub chain from the priority queue; and
        adding the container block to the migration chain.

7. The method of claim 1, further comprising:
    locking the object after detecting the version update of the object;
    receiving a write request to the object after locking the object;
    processing the write request by generating and adding a current block to a current sub chain;
    generating an end container block from the current sub chain;
    adding the end container block to the migration chain;
    unlocking the object; and
    appending a subsequent block from a subsequent write request to the end container block.

8. A system comprising:
a memory coupled to a computer processor;
the memory comprising:
an object that includes a hash chain;
the object executes on the computer processor, uses the memory, and is configured for:
detecting a version update from a first version of the object to a second version of the object, wherein the object is a programming object that includes the hash chain that stores a plurality of fields of the object using the first version of the object;
identifying a plurality of sub chains from the hash chain;
generating a plurality of migration sub chains, using the second version of the object, from the plurality of sub chains using a plurality of processes;
generating a plurality of container blocks including the plurality of migration sub chains;
generating a migration chain from the plurality of container blocks; and
accessing the second version of the object using the migration chain.

9. The system of claim 8,
wherein the plurality of sub chains includes a sub chain,
wherein the plurality of migration sub chains includes a migration sub chain,
wherein the plurality of processes includes a process and includes a plurality of stacks,
wherein the plurality of stacks includes a stack, and
wherein the plurality of container blocks includes a container block.

10. The system of claim 9, wherein the object is further configured for:
generating the migration sub chain from the sub chain by:
traversing the sub chain and storing blocks from the sub chain in the stack, wherein an order of the sub chain with respect to the plurality of sub chains is identified with a serial number of a plurality of serial numbers;
creating the migration sub chain when a front of the sub chain is reached;
creating a migration block from a top block of the stack; and
adding the migration block to the migration sub chain and removing the top block from the stack.

11. The system of claim 10, wherein the object is further configured for:
when the stack includes a next block, setting the next block as the top block and repeating the steps of creating the migration block from the top block and adding the migration block to the migration sub chain.

12. The system of claim 10, wherein the object is further configured for:
sending the migration sub chain to a priority queue with the serial number.

13. The system of claim 9, wherein the object is further configured for:
generating the migration chain by:
creating the container block, wherein the container block includes the migration sub chain from the priority queue; and
adding the container block to the migration chain.

14. The system of claim 8, wherein the object is further configured for:
locking the object after detecting the version update of the object;
receiving a write request to the object after locking the object;
processing the write request by generating and adding a current block to a current sub chain;
generating an end container block from the current sub chain;
adding the end container block to the migration chain;
unlocking the object; and
appending a subsequent block from a subsequent write request to the end container block.

15. A system comprising:
a memory coupled to a computer processor;
the memory comprising:
an object that includes a hash chain;
the object executes on the computer processor, uses the memory, and is configured for:
detecting a version update from a first version of the object to a second version of the object, wherein the object is a programming object that includes the hash chain that stores a plurality of fields of the object using the first version of the object;
locking the object after detecting the version update of the object;
identifying a plurality of sub chains from the hash chain;
generating a plurality of migration sub chains, using the second version of the object, from the plurality of sub chains using a plurality of processes;
generating a plurality of container blocks including the plurality of migration sub chains;
generating a migration chain from the plurality of container blocks;
unlocking the object; and
accessing the second version of the object using the migration chain.

16. The system of claim 15,
wherein the plurality of sub chains includes a sub chain,
wherein the plurality of migration sub chains includes a migration sub chain,
wherein the plurality of processes includes a process and includes a plurality of stacks,
wherein the plurality of stacks includes a stack, and
wherein the plurality of container blocks includes a container block.

17. The system of claim 16, wherein the object is further configured for:
generating the migration sub chain from the sub chain by:
traversing the sub chain and storing blocks from the sub chain in the stack, wherein an order of the sub chain with respect to the plurality of sub chains is identified with a serial number of a plurality of serial numbers;
creating the migration sub chain when a front of the sub chain is reached;
creating a migration block from a top block of the stack; and
adding the migration block to the migration sub chain and removing the top block from the stack.

18. The system of claim 17, wherein the object is further configured for:
when the stack includes a next block, setting the next block as the top block and repeating the steps of creating the migration block from the top block and adding the migration block to the migration sub chain.

19. The system of claim 17, wherein the object is further configured for:
  sending the migration sub chain to a priority queue with the serial number.

20. The system of claim 16, wherein the object is further configured for:
  generating the migration chain by:
    creating the container block, wherein the container block includes the migration sub chain from the priority queue; and
    adding the container block to the migration chain.

\* \* \* \* \*